United States Patent Office 3,395,032
Patented July 30, 1968

3,395,032
HIGH ALUMINA CASTABLE
George H. Criss, Bethel Park, Pa., assignor to Dresser Industries, Inc., Dallas, Tex., a corporation of Delaware
No Drawing. Filed Aug. 17, 1966, Ser. No. 572,923
3 Claims. (Cl. 106—64)

ABSTRACT OF THE DISCLOSURE

A refractory composition consisting of calcium aluminate cement, nonfused alumina material and fused high alumina material, the composition, particularly the fused alumina material, containing sufficient $TiO_2$ to chemically react with contained CaO and $Al_2O_3$ in the batch to provide an increase in strength after firing to an elevated temperature.

---

As is well known in the refractories art, there are relatively few inorganic materials which are suitable by reason of various characteristics to serve as the base material for building refractory articles. Density is one of the more important physical characteristics as is strength and resistance to erosion and abrasion during contact with process materials.

One way of improving density and decreasing abrasion has been known to be the use of a fused material. Fused material is probably the most dense form of a given refractory oxide. Sometimes a minor amount of an additive or crystallizer is used to assist in obtaining even greater density. However, for many uses fused shapes are too brittle; that is to say, they lack thermal shock resistance. However, better shock resistance can be obtained while still retaining many of the benefits of a fused material by grinding the fused material to a grain and reforming it into a refractory for installation.

Particularly when using the fused grain as a specialty (that is to say, a material which is sold in loose or unformed and unburned form), some manner of bonding agent must be included since the fused grain is quite inert and not easily rebonded. It is an object of this invention to provide such a refractory monolith-forming specialty material predominantly comprised of a specially-selected, fused, high alumina grain which is easily rebonded.

Briefly, according to one aspect of the invention, there is provided a high alumina refractory monolith composition of good density, strength, thermal shock resistance, resistance to abrasion and corrosion in service, and particularly when used as a trough mix possessed of further desirable characteristics. ("High alumina" has a well known meaning in the refractories art. See, for example, the discussion in U.S. Patent 3,067,050.) In the preferred embodiment, the composition of this invention is comprised of about 50 parts, by weight, of a special fused grain of approximately —4 mesh sizing; about 20 parts, by weight, of —6 mesh tabular alumina; and about 30 parts, by weight, of calcium aluminate cement. The overall sizing of the composition is about as follows: Passing a 4 and held on a 10 mesh screen—about 30%; passing a 10 and resting on a 28 mesh screen—about 20%; passing a 28 and resting on a 65 mesh screen—about 10%; the remainder passing a 65 mesh screen. About 35 parts, by weight, also passes a 150 mesh screen.

The preferred fused grain has a chemical analysis as follows:

|  | Percent |
|---|---|
| Silica ($SiO_2$) | 0.4 |
| Alumina ($Al_2O_3$) | 96.6 |
| Titania ($TiO_2$) | 2.8 |
| Iron oxide ($Fe_2O_3$) | 0.14 |
| Lime (CaO) | 0.19 |
| Magnesia (MgO) | 0.22 |
| Alkalies | 0.02 |

This grain has a bulk specific gravity of about 3.85. The preferred calcium aluminate cement binder has the following chemical analysis:

|  | Percent |
|---|---|
| Silica ($SiO_2$) | 0.1 |
| Alumina ($Al_2O_3$) | 79.0 |
| Lime (CaO) | 18.0 |

The remainder being minor amounts of MgO, soda, and oxides of iron.

The tabular alumina used has approximately the following chemical analysis:

|  | Percent |
|---|---|
| Silica ($SiO_2$) | 0.03 |
| Alumina ($Al_2O_3$) | 99.5 |
| Titania ($TiO_2$) | 0.03 |
| Iron oxide ($Fe_2O_3$) | 0.2 |

The remainder being CaO, MgO, and trace amounts of alkalies.

The tabular alumina has a density of about 3.55 grams per cubic centimeter. (There are still denser types of nonfused alumina, but they are not used widely today.) Thus, it can be seen that our selected fused alumina grain, having a specific gravity of 3.85 grams per cubic centimeter, is indeed an extremely dense material. This is even more evident when one notes that the theoretical density of alumina is 3.97 grams per cubic centimeter.

Our selected grain includes an effective amount of titania, i.e. titanium dioxide. By "effective amount," we mean sufficient to induce densification and crystal growth in the alumina during the fusion, and thereafter to react in the composition of this invention to provide increased density, modulus of rupture, and cold crushing strength when the material has been fired in a situs of use.

The following data is presented by way of explanation and not by way of limitation. In actual laboratory testing, a group of five mixes was prepared and subjected to comparative testing. Mix B is according to this invention. Mix A used a quantity of grain similar to that used in Mix B, but insufficient to obtain all of the desirable properties found in Mix B. Mix C was a mix made using another type of fused grain not including the titania. Its chemical analysis was approximately as follows:

|  | Percent |
|---|---|
| Alumina ($Al_2O_3$) | 99.6 |
| Silica ($SiO_2$) | 0.1 |
| Titania ($TiO_2$) | 0.1 |
| Iron oxide ($Fe_2O_3$) | 0.1 |
| Lime (CaO) | 0.26 |
| Magnesia (MgO) | 0.06 |
| Alkalies | 0.18 |

As can be seen, this is a much purer system than the fused grain of our invention. Its bulk specific gravity was 3.60.

Mix D is a mix similar to Mix B using the more pure fused grain, but as a direct substitution for the titania-containing grain of Mix B. Mix E is yet another comparable mix, but in which tabular alumina was directly substituted for the fused grain of Mix B. In the following table, the titania-containing grain is labeled Grain I and the more pure grain is labeled Grain II.

| Mix No. | A | B | C | D | E |
|---|---|---|---|---|---|
| Grain I, percent | 25 | 50 | | | |
| Grain II, percent | | | 70 | 50 | |
| Tabular Alumina, percent | 45 | 20 | | 20 | 70 |
| Calcium Aluminate Cement, percent | 30 | 30 | 30 | 30 | 30 |
| Bulk Density, p.c.f.: | | | | | |
| After drying at 250° F | 174 | 177 | 175 | 172 | 168 |
| After heating to 3,000° F | 171 | 178 | 168 | 166 | 163 |
| Modulus of Rupture, p.s.i.: | | | | | |
| After drying at 250° F | 2,240 | 2,110 | 2,780 | 2,770 | 2,780 |
| After heating to 3,000° F | 2,680 | 3,280 | 590 | 1,260 | 2,220 |
| Cold Crushing strength on Flat: | | | | | |
| After drying at 250° F | 11,530 | 9,670 | 13,850 | 9,920 | 9,400 |
| After heating to 3,000° F | 6,090 | 13,600 | 3,260 | 4,950 | 5,270 |

As can be seen, Mix B, after firing to 3000° F., showed an increase in density, whereas all of the other mixes showed a decrease in density. It showed an increase in modulus of rupture after firing to 3000° F., whereas all but Mix A showed a decrease in modulus of rupture. Very remarkable was the drastic loss in strength shown by Mix C—the one using a very large quantity of the more pure fused alumina. Mix A showed an increase in strength as did Mix B, although not to the same degree. The cold crushing strength for Mix B improved markedly after heating to 3000° F., whereas it decreased again, markedly, for all other comparable mixes.

We believe the increase in density, modulus of rupture, and cold crushing strength, after firing, to be predominantly predicated on the chemical reaction in service between the titania and included calcia and alumina in the calcium aluminate cement, and formation of a fluid reaction product, thereby promoting shrinkage of the matrix, i.e., the fines, which explains the increase in density and the superior strength. As noted above, fused grain normally is quite nonreactive. We believe this is the reason Mix C, having no tubular alumina at all nor any constituent which can liquefy at reasonable elevated temperatures to react with the fines, is so weak after elimination of the hydraulic bond of the cement upon firing.

We believe the mix of this invention is particularly useful as a trough mix. Its included lime is known to induce a stickiness for ferruginous slags, thereby promoting formation of a layer thereof, further protecting the otherwise highly chemically-stable and erosion-resistant composition that the present invention is.

As can be seen by a study of Mix B and the analysis of the special grain, only 1.4% titania contributed by the fused grain was sufficient to provide the desired properties shown in the table. Some variation can, of course, be had in the titania quantity. However, Mix A which contained 0.71 part, by weight, of titania (including that contributed by the tubular as well as that contributed by the grain) did not have all of the desired properties. Likewise, Mix C, also having about 0.7 part by weight, of titania, was not successful. Comparison of these three mixes indicates a minimum amount of titania is necessary as well as the perence of a nonfused, more chemically active, alumina material. The preferred range of titania in the mix is about 1.4 to about 3%, based on the total weight of the mix. Quantities of titania (or $TiO_2$ or titanium dioxide—all terms being considered equivalent) greater than those found in the Mix B composition are possible in a variety of ways. For example, high-purity pigment-grade titania, or even the less pure rutile form thereof, can be added to the fusion. Resulting fusion can contain at least 95% $Al_2O_3$, from 0.5 to 5% titania, with any remainder being $SiO_2$, iron oxide, alkalies, and alkaline earth oxides. The nonfused aluminous constituents of the mix can likewise add their share of the titania. For example, diaspore is available having upwards of 4% titania on a calcined basis; Alabama bauxite on a calcined basis has about 2.6%; and South American bauxite has about 3.1%. Satisfactory compositions include 30 to 70% of the fused grain, 40 to 10% of the nonfused aluminous material, and the remainder being the calcium aluminate cement (roughly 10 to 60%).

In the foregoing discussion, all parts and percentages are by weight, and all screen sizing is by Tyler mesh size determination, unless otherwise specified. All chemical analyses are on an oxide or calcined basis in conformity with the practice in the art for reporting the chemical analyses of refractory materials.

Having thus described the invention in detail and with sufficient particularity as to enable those skilled in the art to practice it, what is desired to have protected by Letters Patent is set forth in the following claims.

I claim:
1. As a refractory monolith-forming high alumina composition a refractory size-graded batch of:
   (A) coarsely size-graded fused high alumina material of at least about 95% $Al_2O_3$ and containing 0.5 to 5% $TiO_2$ on a calcined basis,
   (B) nonfused aluminous material, and
   (C) calcium aluminate cement;
the fused grain constituting 30 to 70%, by weight, of the batch, there being sufficient calcium aluminate cement to provide a bond for the mixture, there being sufficient nonfused aluminous material and sufficient total $TiO_2$ in the batch to chemically react with contained CaO and $Al_2O_3$ to provide an increase in density, modulus of rupture, and cold crushing strength after firing to an elevated temperature.

2. The composition of claim 1 in which the composition includes about 1.4 to 3% of $TiO_2$, based on the weight of the batch.

3. The composition of claim 1 in which the nonfused aluminous material is tabular alumina.

References Cited
UNITED STATES PATENTS

| | | | |
|---|---|---|---|
| 2,537,218 | 1/1951 | Giles | 106—64 |
| 2,965,506 | 12/1960 | Veltz | 106—64 |

JAMES E. POER, *Primary Examiner.*